(12) United States Patent
Ratzlaff et al.

(10) Patent No.: US 7,379,889 B2
(45) Date of Patent: May 27, 2008

(54) INTERACTIVE CALENDAR INTERFACE FOR DEFINING AND DISPLAYING DATE RANGES

(75) Inventors: Cordell R. Ratzlaff, Palo Alto, CA (US); Lucas V. Pettinati, Hayward, CA (US)

(73) Assignee: GetThere Inc., Menlo Park, CA (US)

( * ) Notice: Subject to any disclaimer, the term of this patent is extended or adjusted under 35 U.S.C. 154(b) by 1125 days.

(21) Appl. No.: 10/087,809

(22) Filed: Mar. 5, 2002

(65) Prior Publication Data

US 2003/0171965 A1 Sep. 11, 2003

(51) Int. Cl.
*G06F 9/46* (2006.01)

(52) U.S. Cl. .......................................... 705/8
(58) Field of Classification Search ...................... 705/8
See application file for complete search history.

(56) References Cited

U.S. PATENT DOCUMENTS 5,659,768 A * 8/1997 Forbes et al. ............... 715/517
5,948,040 A * 9/1999 DeLorme et al. ........... 701/201
5,970,466 A * 10/1999 Detjen et al. .................. 705/8
6,856,962 B2 * 2/2005 Yonemitsu ..................... 705/8

OTHER PUBLICATIONS

Merriam-Webster's Collegiate Dictionary: Tenth Edition. 1999. p. 294.*

* cited by examiner

*Primary Examiner*—Beth Van Doren
*Assistant Examiner*—Peter H. Choi
(74) *Attorney, Agent, or Firm*—Alston & Bird LLP

(57) ABSTRACT

A method for designating dates in an interactive travel calendar including the steps of providing an interface for users to specify event ranges, each event range having a start date that chronologically precedes an end date, receiving a signal designating a first date associated with an event, receiving a signal designating a second date associated with an event, setting the first date or the second date as a start date for an event range based upon a chronological relationship between the first date and the second date, with the start date being the date earlier chronologically among the first and second date and the end date being the date chronologically later among the first and second date, and presenting information reflecting the event range.

10 Claims, 5 Drawing Sheets

| | | | JUNE | | | | | | | JULY | | | |
|---|---|---|---|---|---|---|---|---|---|---|---|---|---|
| S | M | T | W | T | F | S | S | M | T | W | T | F | S |
| | | | | | 1 | 2 | 1 | 2 | 3 | 4 | 5 | 6 | 7 |
| 3 | 4 | 5 | 6 | 7 | 8 | 9 | 8 | 9 | 10 | 11 | 12 | 13 | 14 |
| 10 | 11 | 12 | 13 | 14 | 15 | 16 | 15 | 16 | 17 | 18 | 19 | 20 | 21 |
| 17 | 18 | 19 | 20 | 21 | 22 | 23 | 22 | 23 | 24 | 25 | 26 | 27 | 28 |
| 24 | 25 | 26 | 27 | 28 | 29 | 30 | 29 | 30 | 31 | | | | |
Fig. 3
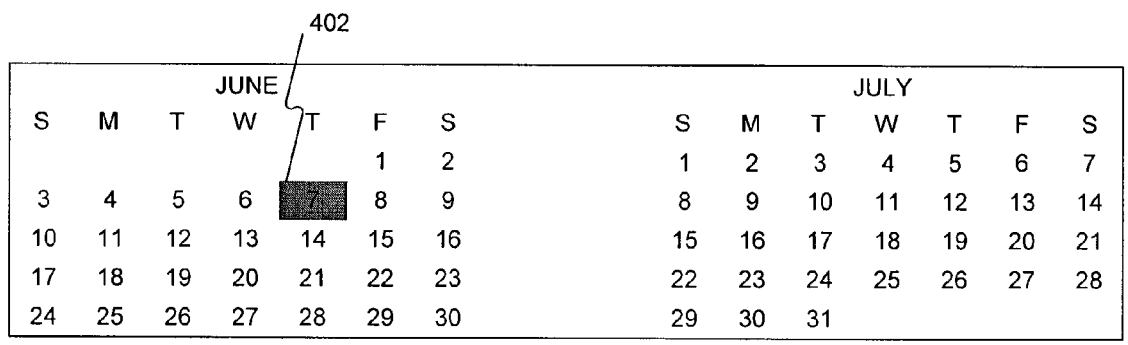
Fig. 4
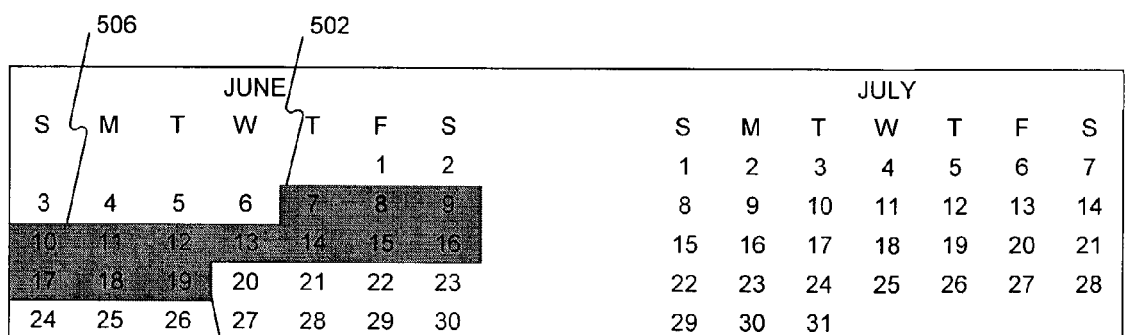
Fig. 5

| | | | JUNE | | | | | | | JULY | | | |
|---|---|---|---|---|---|---|---|---|---|---|---|---|---|
| S | M | T | W | T | F | S | S | M | T | W | T | F | S |
| | | | | | 1 | 2 | 1 | 2 | 3 | 4 | 5 | 6 | 7 |
| 3 | 4 | 5 | 6 | 7 | 8 | 9 | 8 | 9 | 10 | 11 | 12 | 13 | 14 |
| 10 | 11 | 12 | 13 | 14 | 15 | 16 | 15 | 16 | 17 | 18 | 19 | 20 | 21 |
| 17 | 18 | 19 | 20 | 21 | 22 | 23 | 22 | 23 | 24 | 25 | 26 | 27 | 28 |
| 24 | 25 | 26 | 27 | 28 | 29 | 30 | 29 | 30 | 31 | | | | |

Fig. 8

| | | | JUNE | | | | | | | JULY | | | |
|---|---|---|---|---|---|---|---|---|---|---|---|---|---|
| S | M | T | W | T | F | S | S | M | T | W | T | F | S |
| | | | | | 1 | 2 | 1 | 2 | 3 | 4 | 5 | 6 | 7 |
| 3 | 4 | 5 | 6 | 7 | 8 | 9 | 8 | 9 | 10 | 11 | 12 | 13 | 14 |
| 10 | 11 | 12 | 13 | 14 | 15 | 16 | 15 | 16 | 17 | 18 | 19 | 20 | 21 |
| 17 | 18 | 19 | 20 | 21 | 22 | 23 | 22 | 23 | 24 | 25 | 26 | 27 | 28 |
| 24 | 25 | 26 | 27 | 28 | 29 | 30 | 29 | 30 | 31 | | | | |

Fig. 9

INTERACTIVE CALENDAR INTERFACE FOR DEFINING AND DISPLAYING DATE RANGES

DESCRIPTION OF THE INVENTION

1. Field of the Invention

The present invention relates to the field of user interfaces. More specifically, the present invention relates to a method and apparatus for assuring that dates inputted into a user interface that provides an interactive calendar define a valid date range.

2. Background of the Invention

An interface is a service provided to users to facilitate the input of information, which may be processed in accordance with a particular method. For example, interfaces are commonly used in computer applications, such as a travel planning application, to provide the user of the application with a means for inputting information, such as by mouse or keypad. In the case of the travel planning application, the input may consist of a date or dates that will be processed in order to determine the time period during which the user wishes to travel. The program will then process these inputted dates in accordance with its processes, such as by reserving airline tickets for those dates.

An interactive calendar is a type of interface that provides a user the ability to enter date information. Such an interface may be used in the travel business to book flights or hotel reservations, or for individuals to schedule meetings. One type of interactive calendar is a computer application, which provides the user of the computer the ability to input date information for processing by an application. Such an interactive calendar can function either as a stand-alone application, or as part of a distributed application run across a network of computers, such as the Internet.

SUMMARY OF THE INVENTION

In accordance with the invention, a method for designating dates in an interactive travel calendar including the steps of providing an interface for users to specify event ranges, each event range having a start date that chronologically precedes an end date, receiving a signal designating a first date associated with an event, receiving a signal designating a second date associated with an event, setting the first date or the second date as a start date for an event range based upon a chronological relationship between the first date and the second date, with the start date being the date earlier chronologically among the first and second date and the end date being the date chronologically later among the first and second date, and presenting information reflecting the event range. The method may further include receiving a signal designating a new date associated with the event, and setting the new date as a new end date based on a determination that the new date chronologically succeeds the end date for the event range, to form a new event range. The method may further include receiving a signal designating a new date associated with the event, and setting the new date as a new start date based on a determination that the new date chronologically precedes the start date for the event range, to form a new event range. The method may further include receiving a signal designating a new date associated with the event, and setting the new date as a new end date based on a determination that the new date falls chronologically within the event range, and the start date was selected before the end date, to form a new event range. The method may further include receiving a signal designating a new date associated with the event, and setting the new date as a new start date based on a determination that the new date falls chronologically within the event range, and the end date was selected before the start date, to form a new event range.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 3 is an example of an initial view of one configuration of a calendar interface consistent with the present invention;

FIG. 4 is an example of a calendar interface after a first date has been inputted consistent with the present invention;

FIG. 5 is an example of a calendar interface, modified to reflect a date range, consistent with the present invention;

FIG. 6 is an example of a calendar interface reflecting a new travel range resulting from a user selected date occurring before the travel range, consistent with the invention;

FIG. 7 is an example of a calendar interface reflecting a new travel range resulting from a user selected date occurring after the travel range, consistent with the present invention;

FIG. 8 is an example of a calendar interface reflecting a new travel range resulting from a user selected date occurring during the travel range and with the existing start date having been chosen before the existing end date, consistent with the present invention; and FIG. 9 is an example of a calendar interface reflecting a new travel range resulting from a user selected date occurring during the travel range and with the existing end date having been chosen before the existing start date, consistent with the present invention.

DETAILED DESCRIPTION

Reference will now be made in detail to the present embodiments of the invention, examples of which are illustrated in the accompanying drawings. Wherever possible, the same reference numbers will be used throughout the drawings to refer to the same or like parts.

Figure 1:
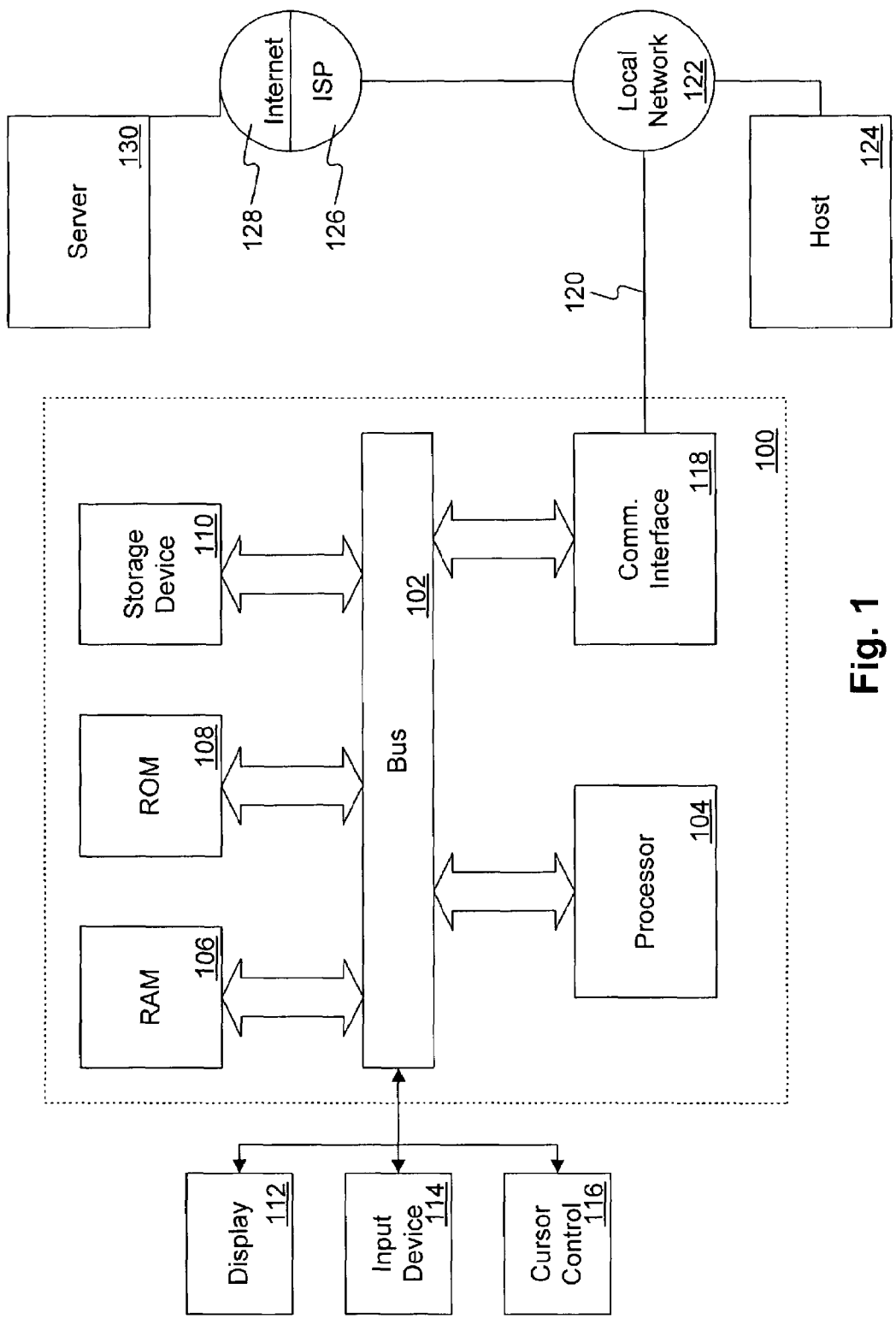
FIG. 1 is a diagram of an exemplary computer in which the features and aspects of the present invention may be implemented.

The present invention may be implemented by computers organized in a conventional distributed processing system architecture. FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory, such as a random access memory (RAM) 106 or other dynamic storage device, coupled to bus 102 for storing information and instructions to be executed by processor 104. RAM 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axis, a first axis (e.g., x) and a second axis (e.g., y), that allows the device to specify positions in a plane.

The invention is related to calendar interfaces such as those generated by computer system 100 for inputting date information. According to one implementation of the invention, a calendar interface is generated by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In an alternative implementation, hard-wired circuitry may be used in place of or in combination with software instructions to implement the invention. Thus, implementations of the invention are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 and/or to data equipment operated by an Internet Service Provider (ISP) 126. ISP 126 in turn provides data communication services through the Internet 128. Local network 122 and Internet 128 both use electric, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 may transmit a requested code for an application program through Internet 128, ISP 126, local network 122 and communication interface 118. In accordance with the present invention, one such downloaded application may be a calendar interface. The received code may be executed by processor 104 as it is received, and/or stored in storage device 110, or other non-volatile storage for later execution. In this manner, computer system 100 may obtain application code in the form of a carrier wave.

Although computer system 100 is shown in FIG. 1 as being connectable to one server, 130, those skilled in the art will recognize that computer system 100 may establish connections to multiple servers on Internet 128. Each such server includes an HTML-based Internet application, which may provide information to computer system 100 upon request in a manner consistent with the present invention.

Systems and methods consistent with the present invention provide a calendar interface that facilitates the selection of dates for events such as trips, programs, and meetings. According to one aspect consistent with the principles of the present invention, the calendar interface displays a calendar with dates arranged by month. In one view, the calendar interface may be used to display one or more calendar months, for example, the month January 2002 alone, or with December 2001.

Figure 2:
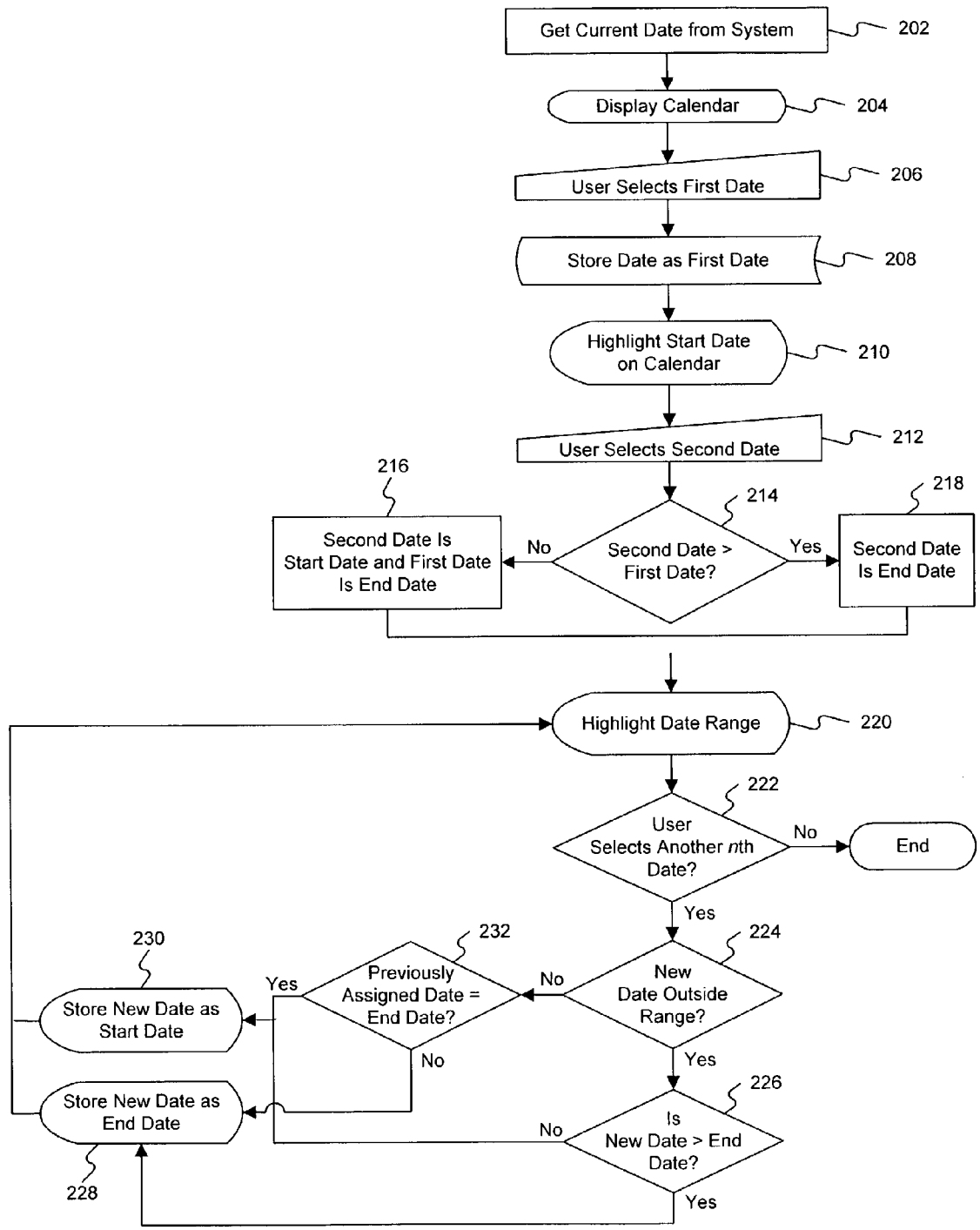
FIG. 2 shows a flowchart depicting the steps involved in entering a valid date range and for modifying a date range to a new valid date range consistent with the present invention.

Referring to FIG. 2, when a user invokes the calendar interface, a process begins by identifying the current month, step 202. Invoking the interface can be done, for example, by accessing the system clock to determine the current date, and deriving from that the current month. Alternatively, this can be done by accessing a date stored in a memory associated with the interface and determining the current month from the stored date. The memory may, in a stand alone configuration reside on the user's computer. In addition, in a server-client configuration, the memory may reside on the server with the calendar interface, with the user accessing the calendar interface and the memory from the client computer. Known communications protocols such as the Hyper Text Transfer Protocol can facilitate the communication between the server and client. The client then displays a calendar displaying at least the current month, step 204. The interface also allows the user to scroll through the months using, for example, designated buttons displayed in connection with the calendar.

From the calendar interface, the user may then select a first date, step 206. A user may select a date in any manner, which indicates to the process that a particular one of the days has been chosen. For example, the date may be selected by pointing a mouse cursor to it and clicking the mouse button. Once the date has been selected, the interface stores the first date in a memory, step 208. Again, the memory can be on the user's computer or on a server computer accessible to the user from a client computer. This first date is initially set as a start date.

Once the first date has been set as the start date, the interface then modifies the calendar interface to highlight the selected date, step 210. The date may be highlight by using a different gray scale, or by changing the color of the background behind for that day. Highlights may be implemented in many different ways, so long as the user can distinguish the selected date from the remainder of the calendar.

The interface then allows the user to select a second date from the interface, step 212. As with the selection of the first date, the interface may allow the user to make their selection in any manner that identifies the selected date to the interface. The second date may also be stored in memory. Once the second date is selected, the interface compares the second selected date to the first date, step 214. If the second date is chronologically before the first date, then the interface stores the first date as the end date and the second date as the start date, step 216. The interface may store the start and end date in memory. If, however, the second date is chronologically after the first date, then the interface stores the second date as the end date and the first date remains the start date, step 218. The start and end dates may again be stored in memory. In either case, the start and end date define a current date range.

Once the start date and end date have been designated, the interface displays the calendar modified to highlight the range of dates selected, step 220. As with the highlight of the start date, the highlight may be accomplish by using a different gray scale, or by changing the background color. In addition, when highlighting the range, the interface may highlight only the start and end dates of the range, or it may highlight every day within the range. Again, all that is important is that the user be able to distinguish between the range and the remainder of the calendar.

The calendar interface then facilitates the user modifying the date range. The interface permits the user to select another date, step 222. If the user does not select another date then the process ends. If, however, the user does select another date, the selection may again use any method that identifies to the interface the date chosen. Once the new date is selected, it may be stored in memory. The interface then compares the new date with the current date range, step 224. If the new date is before the current start date, then the new date is stored as a new start date, defining a new range, step 230. If, however, the new date falls after the current end date (at step 226), then the new date is stored as a new end date, step 228.

If, however, the process determines (at step 224) that the new date falls within the date range (i.e., it is one of the dates in the current range), then the interface must perform another comparison to determine which of the current end date and start date was the last date set, step 232. At step 232, if the current start date was assigned before the current end date, then the new date is the new start date, step 230. If however, the current end date was assigned before the current start date, then the new date is the new end date, step 228.

An example of a calendar interface configured to display a graphical representation of a calendar for the selection of dates consistent with the principles of the present invention is shown in FIG. 3. In this configuration, the calendar interface displays two months on the calendar, June and July. While not shown in this example, a means for scrolling to previous or future months may also be included. While the user can select dates from this interface, the interface depicted does not show the means for selecting a date. The selection could be made by any means described above.

FIG. 4 depicts the graphical calendar interface of FIG. 3 after the user has selected a first date. Once selected, the interface highlights the date selected in order for the user to distinguish the selected date from the remainder of the calendar dates. In FIG. 4, the interface is configured to alter the gray scale of the background behind the selected date. Thursday, June 7, is shown as the highlighted, first-selected date, 402, in FIG. 4. The user may then input a second selected date.

Referring to FIG. 5, there is depicted an example of the calendar interface of FIG. 4, modified to highlight the date range resulting from the selection of the second date. In FIG. 5, the first date selected, June 7, and the second date selected, June 19, define date range 506. Because the first selected date, June 7, occurs chronologically before the second date, June 19, the first date remains as start date 502. The second date, June 19, becomes end date 504, and date range 506 includes all days falling between start date 502 and end date 504. The interface in this example is configured to highlight the background behind each date within date range 506. The interface may be configured to allow the user to select further dates and modify the existing date range.

Figures 6, 7:
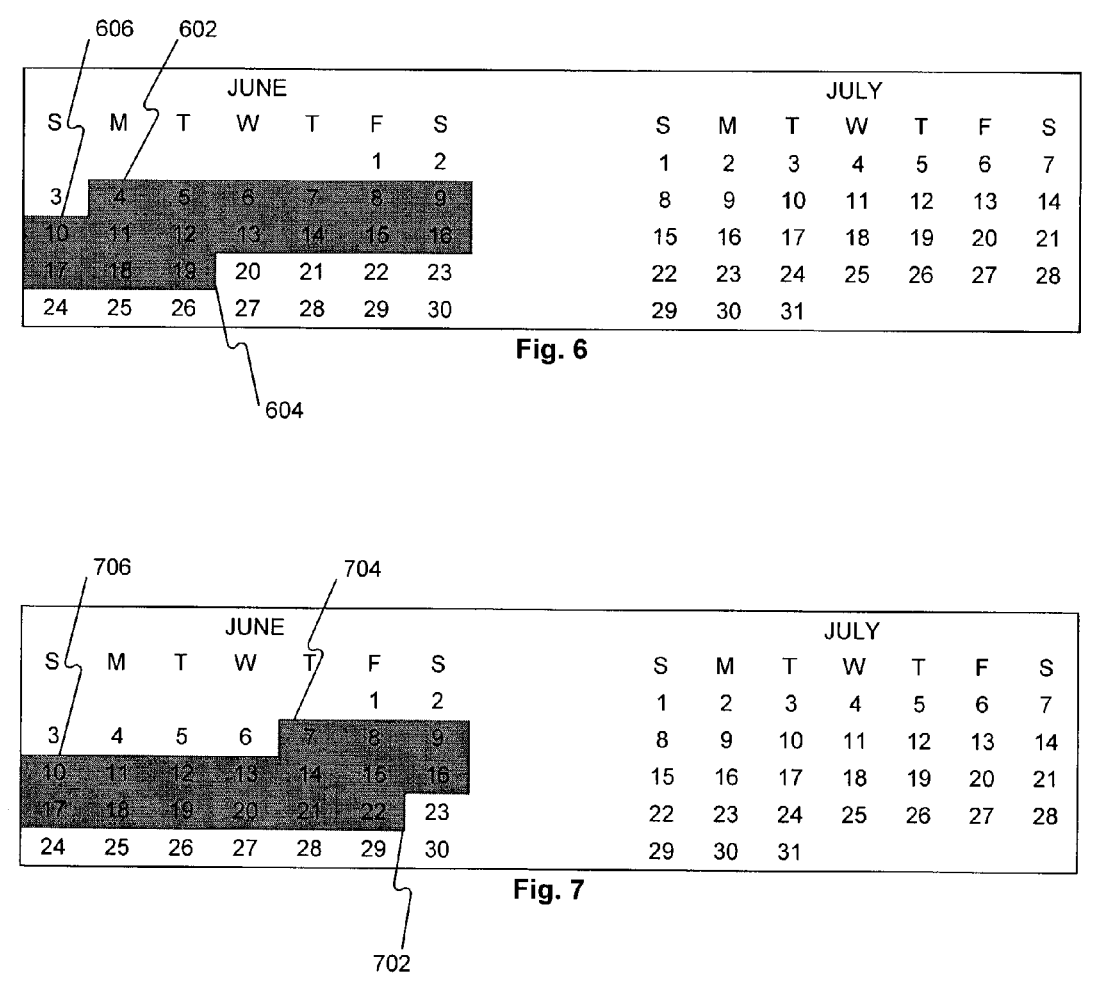

Referring to FIG. 6, there is depicted an example of a calendar interface, consistent with the principles of the present invention, highlighting new date range 606 in which the new date selected occurs chronologically before the start date of the current date range. Once the new date, June 4, is selected, the interface compares the new date to the current range (506, FIG. 5). The calendar interface is configured to designate the new date as new start date 602, because it falls chronologically before the date range. June 4 falls before the current date range, June 7 to June 19, therefore June 4 becomes the new start date. The current end date June 19, remains as new end date 604, and, together with new start date 602, define new date range 606. The interface may then highlight new date range 604 to allow the user to distinguish the selected date range from the remainder of the calendar. In this example, the calendar interface modifies the color of the background behind new date range 606.

In FIG. 7, there is depicted an example of a calendar interface, consistent with the principles of the present invention, highlighting new date range 706 in which the new date selected occurs chronologically after the end date of the current date range. Once the new date, June 22, is selected, the interface compares the new date to the current range (506, FIG. 5). The calendar interface is configured to designate the new date as new end date 702, because it falls chronologically after the date range. June 22 falls after the current range (June 7 to June 19), and therefore, June 22 becomes new end date, 702. The current start date remains as new start date 704, and, together with new end date 702, define new date range 706. The interface may then highlights new date range 706 to allow the user to distinguish the selected date range form the remainder of the calendar. In this example, the calendar interface modifies the color of the background behind new date range 706.

In FIG. 8, there is depicted an example of a calendar interface, consistent with the principles of the present invention, highlighting new date range 806 in which the new date selected falls within the current date range. Once the new date, June 12, is selected, the interface compares the new date to the current range (506, FIG. 5). The calendar interface is configured to designate the new date as new start date 802, because it falls chronologically during the current date range, and the current start date (not depicted) was chosen prior to the current end date. The current end date remains as new end date 804, and, together with new start date 802, define new date range 806. The interface may then highlight new date range 806 to allow the user to distinguish the selected date range from the remainder of the calendar. In this example, the calendar interface modifies the color of the background behind new date range 806.

In FIG. 9, there is depicted an example of a calendar interface, consistent with the principles of the present invention, highlighting new date range 906 in which the new date selected falls within the current date range. Once the new date, June 12, is selected, the interface compares the new date to the current range (506, FIG. 5). The calendar interface is configured to designate the new date as new end date 902, because it falls chronologically during the current date range, and the current end date (not depicted) was chosen prior to the current start date. The current start date remains as new start date 904, and, together with new end date 902, defines new date range 906. The interface may then highlight new date range 906 to allow the user to distinguish the selected date range from the remainder of the calendar. In this example, the calendar interface modifies the color of the background behind new date range 906.

Although the interface discussed thus far involves graphical aspects for the display of a calendar, selection of month (s) for an event, and selection of an event range, those skilled in the art will appreciate that other interfaces may also be employed without departing from the scope of the present invention. For example, the interface may be an audible one to enable the visually impaired to enter and modify an event range stored in a computer. In other configurations, the event range may be used to reserve, book or otherwise arrange travel plans, meetings or event facilities.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for designating dates in an interactive travel calendar comprising:
    providing an interface for users to select event ranges, each event range having a start date that chronologically precedes an end date;
    receiving a signal designating a first date associated with an event;
    receiving a signal designating a second date associated with an event;
    comparing the first date and the second date after receiving the respective signals designating the first and second dates in order to automatically determine a chronological relationship between the first date and the second date;
    automatically determining a start date for an event range based upon the chronological relationship between the first date and the second date, with the start date being the date earlier chronologically among the first and second date and the end date being the date chronologically later among the first and second date;
    receiving a signal designating a new date associated with the event, wherein the new date is set as a new end date based on an automated determination that the new date falls chronologically within the event range, and the start date was selected before the end date, and wherein the new date is set as a new start date based on an automated determination that the new date falls chronologically within the event range, and the end date was selected before the start date; and
    presenting information reflecting the event range.

2. The method of claim 1, further comprising:
    setting the new date as a new end date based on an automated determination that the new date chronologically succeeds the end date for the event range to form a new event range.

3. The method of claim 1, further comprising:
    setting the new date as a new start date based on an automated determination that the new date chronologically precedes the start date for the event range to form a new event range.

4. A method for specifying an event range comprising:
    providing an interface for users to specify event ranges, each event range comprising a start date that chronologically precedes an end date;
    receiving a series of dates associated with an event;
    comparing two of the dates in the series of dates after receiving the series of dates in order to automatically determine a chronological relationship between the two dates in the series of dates;
    setting the two dates in the series of dates as a start date and an end date for an event range based on the chronological relationship between the two dates, with the date from the series set as the start date being chronologically earlier than the date from the series that is set as the end date;
    setting a third date in the series as a new start date for the event range based on an automated determination that the third date falls within the event range, and the current start date was received before the current end date, and setting the third date in the series as a new end date for the event range based on an automated determination that the third date falls within the event range, and the current end date was received before the current start date; and presenting information reflecting the event range.

5. The method of claim 4 further comprising: setting a third date in the series as a new start date for the event range based on an automated determination that the third date precedes the start date of the event range.

6. The method of claim 4 further comprising: setting a third date in the series as a new end date for the event range based on an automated determination that the third date succeeds the end date of the event range.

7. A method for specifying an event range, comprising:

setting a first date and a second date as an initial start date and an initial end date for an event range based on a chronological relationship between the first date and second date;

presenting information reflecting the event range; and enabling a user to modify the presented information by selecting a third date, wherein the third date is set as a new start date for the event range based on an automated determination that the third date falls within the event range, and the initial start date was received before the initial end date, and wherein the third date is set as a new end date for the event range based on an automated determination that the third date falls within the event range and the initial end date was received before the initial start date.

8. A data processing system having computer-readable instructions stored therein for generating a graphical user interface for selecting dates in an interactive calendar, the computer-readable instructions, when executed, causing the data processing system to:

generate an initial view including a monthly calendar interface for users to select event ranges thereon, each event range having a start date that chronologically precedes an end date, wherein upon receiving a signal designating a first date and a second date associated with an event in response to a respective selection on the monthly calendar interface by the user, the first date or the second date is designated as a start date for an event range based upon a chronological relationship between the first date and the second date, with the one of the first and second date that is chronologically before the other set as the start date, and the other date set as the end date;

generate a new view including a monthly calendar interface presenting information reflecting the event range, wherein the new view further includes a range of selectable dates, and wherein upon receiving a signal designating a new date associated with the event in response to a selection on the monthly calendar interface by the user, the new date is set as a new end date based on an automated determination that the new date falls chronologically within the event range, and the start date was selected before the end date, to form a new event range, and the new date is set as a new start date based on an automated determination that the new date falls chronologically within the event range, and the end date was selected before the start date, to form a new event range; and generate a third view including a monthly calendar interface presenting information reflecting the new event range.

9. The data processing system of claim 8, wherein:

the new date is set as a new end date based on an automated determination that the new date chronologically succeeds the end date for the event range, to form a new event range.

10. The data processing system of claim 8, wherein:

the new date is set as a new start date based on an automated determination that the new date chronologically precedes the start date for the event range, to form a new event range.

* * * * *